US006916546B2

(12) United States Patent
Schoennenbeck et al.

(10) Patent No.: US 6,916,546 B2
(45) Date of Patent: Jul. 12, 2005

(54) METHOD FOR THE PRODUCTION OF DARK PROTECTIVE LAYERS ON FLAT OBJECTS MADE FROM TITANIUM ZINC

(75) Inventors: Marianne Schoennenbeck, Bochum (DE); Adolf Stradmann, Datteln (DE)

(73) Assignee: Rheinzink GmbH & Co. KG, Datteln (DE)

( * ) Notice: Subject to any disclaimer, the term of this patent is extended or adjusted under 35 U.S.C. 154(b) by 0 days.

(21) Appl. No.: 10/495,032

(22) PCT Filed: Nov. 15, 2002

(86) PCT No.: PCT/EP02/12800

§ 371 (c)(1), (2), (4) Date: May 10, 2004

(87) PCT Pub. No.: WO03/048417

PCT Pub. Date: Jun. 12, 2003

(65) Prior Publication Data

US 2005/0003091 A1 Jan. 6, 2005

(30) Foreign Application Priority Data

Nov. 16, 2001 (DE) ........................................ 101 56 475

(51) Int. Cl.[7] ......................... B32B 15/04; B32B 15/08; C23C 22/53

(52) U.S. Cl. ........................ 428/469; 428/702; 148/243

(58) Field of Search ................................ 428/469, 702, 428/689; 420/521, 515; 148/265, 267, 269, 281, 282, 284, 243; 427/309, 327

(56) References Cited

U.S. PATENT DOCUMENTS

| | | | | |
|---|---|---|---|---|
| 4,051,887 A | * | 10/1977 | Groth et al. | 164/476 |
| 5,160,552 A | * | 11/1992 | Tomita et al. | 148/277 |

FOREIGN PATENT DOCUMENTS

| | | | | |
|---|---|---|---|---|
| DE | 3311334 A1 | * | 10/1984 |
| DE | 196 36 370 A1 | | 9/1996 |
| EP | 0294877 A1 | * | 6/1988 |
| EP | 0723028 A2 | * | 7/1996 |
| WO | WO 97/20959 | * | 6/1997 |
| WO | WO 01/70426 A2 | * | 9/2001 |

OTHER PUBLICATIONS

"Quality Zinc", Tuev Produkt und Umwelt GmbH, Institut fuer Umweltschutz und Energietechnik, Am grauen Stein, 51105 Koeln.

* cited by examiner

*Primary Examiner*—John J. Zimmerman
(74) *Attorney, Agent, or Firm*—Milde & Hoffberg, LLP

(57) ABSTRACT

The invention relates to the production of protective coatings with a dark color by pickling rolled flat objects, made from titanium zinc, for use in construction. The flat objects are pickled in an aqueous pickling bath containing a mixed acid of sulphuric acid and nitric acid and passivated after rinsing by application of a protective layer. Rolled flat objects such as those made from a titanium zinc alloy are used. The alloy comprises mainly zinc of high purity with additionally a copper content of 1.0 to 2.0 wt. %, a titanium content of 0.06 to 0.2 wt. % and a maximum aluminum contant of 0.015 wt. %.

7 Claims, No Drawings

METHOD FOR THE PRODUCTION OF DARK PROTECTIVE LAYERS ON FLAT OBJECTS MADE FROM TITANIUM ZINC

BACKGROUND OF THE INVENTION

The invention relates to a method for the production of protective layers with a dark hue through pickling of rolled flat objects made of titanium zinc alloys, for use in the field of construction, whereby the flat objects are pickled in an aqueous pickling bath consisting of a mixed acid containing sulfuric acid and nitric acid, and are passivated after rinsing by forming a protective layer. The invention additionally relates to flat objects provided with protective layers.

Such a method is known from DE 196 36 370 A1 of the applicant, the subject matter of which is incorporated by reference in the present application. With the treatment of titanium zinc sheets made of a titanium zinc alloy with 0.07 to 0.12 percent by weight titanium, up to 0.015 percent by weight aluminum, 0.08 to 0.17 percent by weight copper and the remaining part of 99.995 percent zinc as disclosed in said document, homogeneous, gray protective layers are achieved on the surface of the titanium zinc sheets, whereby the gray coloration is perceived as particularly advantageous from an esthetic point of view because it corresponds to the natural patina of zinc. In its composition, the alloy disclosed in DE 196 36 370 A1 corresponds to the criteria of a "quality zinc" catalog of the "TÜV Produkt und Umwelt GmbH, Institut für Umweltschutz und Energietechnik", located at Am grauen Stein, 51105 Köln.

However, it has become apparent that with the known method a darker coloration of the metal sheets, which is desired in some instances, can be achieved only to a limited degree, and only by using more strongly concentrated acids. This results in the problem that with stronger acid concentrations, i.e., lower pH values of the pickling bath, the substance of the alloy is attacked and the metal thickness is reduced. In particular, the use of a mixed acid with a very low pH value leads to an undesired layer structure on the surface because of the formation of poorly bonding layers of a so-called pickling sludge. Thus, with the known method, limits are set for a stronger darkening of the titanium zinc sheets. However, for the field of construction, often very dark colored surface layers are desired, in particular in the field of roof coverings or facade covers, in order to keep the contrast between the pre-weathered zinc sheets and other used construction materials, for example black slate shingles or pantiles, to a minimum, or to create a strong contrast to white surfaces.

Methods for creating a dark surface with titanium zinc through phosphating (cf. DIN 50 942) are known as well. However, these methods alter the metallic surface structure in an undesired manner if the surface is not to be coated with paint.

SUMMARY OF THE INVENTION

The objective of the present invention is to develop a method of the type mentioned above with which titanium sheets with a very dark to black coloring of the surface can be produced, an with which the natural structure of the metal surface is retained.

This objective is achieved in a manner where, contrary to the aforementioned alloy formulation, a titanium zinc alloy with an elevated copper content of 1.0 to 2.0 percent by weight is used, while containing the titanium and aluminum percentages mentioned above.

Surprisingly, when using this elevated copper content in connection with the essentially known additional alloy components and treatment methods, a darker patina can be obtained than when using alloys with the usual, lower copper content. According to current knowledge, the patina consists in particular of zinc carbonate with traces of copper.

The obtained mat black color allows for a harmonious blending of such patinated construction materials, particularly in roof coverings with black pantiles or shingles, and, where contrasts are desired, a clear black/white distinction can be achieved. Even a content of preferably 1.1 to 1.4 percent by weight of copper in the alloy is sufficient. The method subject to the invention is described below based on an exemplary embodiment.

A titanium zinc alloy containing 0.06 to 0.2 percent by weight of titanium and a maximum of 0.015 percent by weight of aluminum is used. According to the invention, a copper content of more than 1.0 percent by weight and up to 2.0 percent by weight, preferably 1.1 to 1.3 percent by weight Cu is provided. The main portion of the alloy consists of zinc, that is, depending on the content of the alloy components titanium, aluminum and copper, about 97.7 to 98.9 percent by weight of zinc with a purity grade of 99.995 percent by weight.

A strip consisting of a zinc alloy with an elevated copper content with a thickness of 0.8 mm and a width of 600 mm is degreased by rinsing with an alkaline degreasing solution at a temperature of 60° C. and a rinse pressure of about 2.5 bar and thereafter sprayed down with a jet stream of water at a temperature of 65° C. and a pressure of 2.5 bar. To support the rinse process and to roughen the surface, the strip is brushed during the last rinsing stage. The strip is then pickled in a pickling plant at a pickling temperature of 30 to 80° C., preferably about 50° C. The pickling bath contains a mixed acid of about 30 to 60 g/l sulfuric acid and about 20 to 50 g/l nitric acid in water. In addition, about 25 to 80 g/l, preferably about 50 g/l, zinc ions are present in a dissolved state.

Essentially, the speed of the pickling reaction depends on the content of free acid. The reduction of the nitric acid is the dominating reaction and prevents the development of hydrogen. The acid content influences the pickling result as well.

Preferably, a mixed acid with 2 to 10 percent by volume sulfuric acid and 2 to 10 percent by volume nitric acid is used at a mixing ratio of sulfuric acid:nitric acid of less or equal to 3:1 and with a free acid content of 25 to 100 g/l.

The strip exiting the pickling plant is rinsed in the manner described above. Thereafter, preferably an additional protective layer is produced by applying and drying of chromate-containing polymer dispersions as follows.

After removing residual water, a mixture of 65 to 98 percent by volume, preferably 95 percent by volume, of a polymer dispersion and 2 to 35 percent by volume, preferably 5 percent by volume, of an aqueous chromate solution is applied to the strip by roll-coating. This coat is dried at a temperature of about 80 to 120° C. The coating thickness of this produced film in the dried state is about 0.4 to 3.0 ìm, preferably 1.5 ìm.

Polymer dispersion refers to a mixture of styrene acrylate, aliphatic polyester and polyurethane, for example.

Preferably, a flat object of a titanium zinc alloy is obtained from the method subject to the invention that contains primarily high purity grade zinc and in addition contains a copper content of 1.0 to 2.0 percent by weight, a titanium content of 0.07 to 0.12 percent by weight and an aluminum content of max. 0.015 percent by weight and exhibits a mat black patina. Preferably, the latter is covered by a protective layer with a thickness of 0.4 to 3.0 ìm, which for the exemplary embodiment has been obtained by applying and drying a chromate-containing polymer dispersion; the corresponding weight per unit area of the coating is 5 to 40 $mg/m^2$.

There has thus been shown and described a novel method for the production of dark protective layers on flat objects made of titanium zinc which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method for producing protective layers with a dark hue through pickling of rolled flat objects made of titanium zinc, for use in the field of construction, whereby the flat objects are pickled in an aqueous pickling bath consisting of a mixed acid containing sulfuric acid and nitric acid, and are passivated after rinsing by applying a protective layer, the improvement wherein rolled flat objects of a titanium zinc alloy are used, where the alloy exhibits primarily high purity grade zinc and additionally a copper content of 1.1 to 2.0 percent by weight, a titanium content of 0.06 to 0.2 percent by weight and an aluminum content of max. 0.015 percent by weight.

2. A method as set forth in claim 1, wherein the copper content is between 1.1 and 1.4 percent by weight.

3. A method as set forth in claim 1, wherein the purity grade of the zinc in the alloy is 99.995 percent by weight.

4. A method as set forth in claim 1, wherein the pickling bath contains 30 to 60 g/l sulfuric acid ($H_2SO_4$) and 20 to 50 g/l nitric acid ($HNO_3$) in addition to water.

5. A method as set forth in claim 1, wherein an additional protective layer is produced by applying and drying of a chromate-containing polymer dispersion.

6. A flat object made of a titanium zinc alloy that consists primarily of high purity grade zinc and in addition exhibits a copper content of 1.0 to 2.0 percent by weight, a titanium content of 0.07 to 0.12 percent by weight and an aluminum content of maximum 0.015 percent by weight, and that is pickled in a pickling bath with sulfuric acid and nitric acid and passivated with a dark protective layer.

7. A flat object as set forth in claim 6, wherein the passivating protective layer is covered with an additional protective coating by applying and drying of a chromate-containing polymer dispersion.

* * * * *